Figure 1:
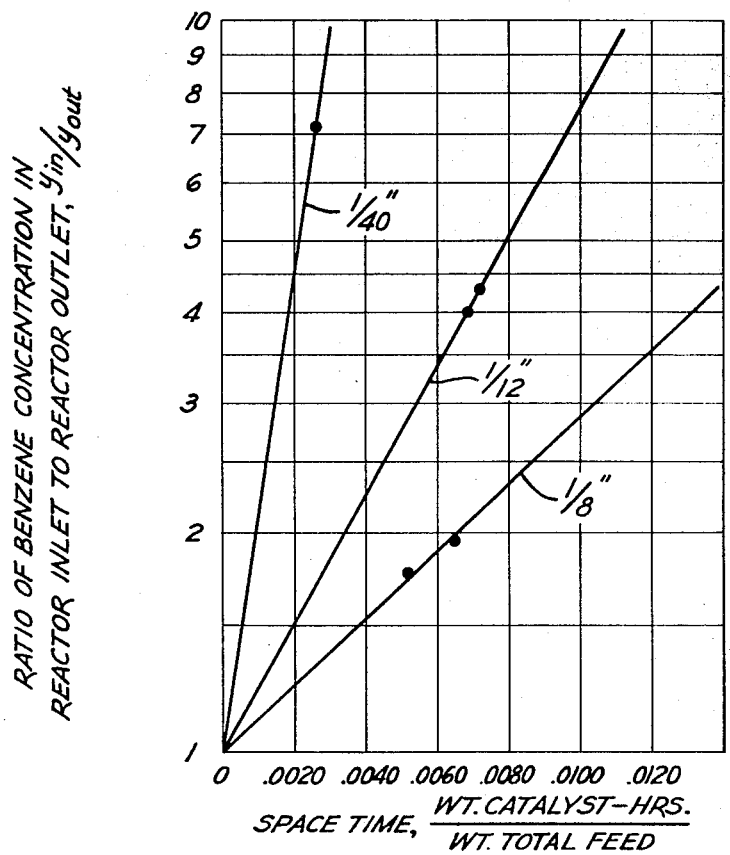

United States Patent [11] 3,622,645

| [72] | Inventors | Norman L. Carr<br>Allison Park;<br>Allen E. Somers, Pittsburgh, both of Pa. |
|---|---|---|
| [21] | Appl. No. | 34,408 |
| [22] | Filed | May 4, 1970 |
| [45] | Patented | Nov. 23, 1971 |
| [73] | Assignee | Gulf Research & Development Company<br>Pittsburgh, Pa. |

[54] CONVERSION OF BENZENE TO CYCLOHEXANE IN THE PRESENCE OF A CATALYST OF SMALL PARTICLE SIZE
11 Claims, 2 Drawing Figs.

[52] U.S. Cl. .................................................. 260/667
[51] Int. Cl. ................................................... C07c 5/10
[50] Field of Search .................................... 260/666 P, 667

[56] References Cited
UNITED STATES PATENTS

| 1,251,202 | 12/1917 | Ellis | 260/667 |
|---|---|---|---|
| 3,213,150 | 10/1965 | Cabbage | 260/667 |
| 3,426,090 | 2/1969 | Fighel | 260/667 |
| 3,461,181 | 8/1969 | Safo | 260/667 |
| 3,427,361 | 2/1969 | Arnold | 260/667 |
| 3,254,134 | 5/1966 | Smith et al. | 260/667 |

*Primary Examiner*—Delbert E. Gantz
*Assistant Examiner*—Veronica O'Keefe
*Attorneys*—Meyer Neishloss, Deane E. Keith and Alvin E. Ring ABSTRACT: A process for the production of substantially pure cyclohexane from a mixture of benzene, cyclohexane and hydrogen in the presence of a hydrogenation catalyst. The product purity is improved and particularly the contamination of the product by the production of undesirable normal paraffins is reduced when utilizing hydrogenation catalyst particles of not more than one-tenth inch in diameter. A preferred embodiment of the process utilizes relatively smaller catalyst particles in the last zone of a plurality of reaction zones.

BENZENE HYDROGENATION FOR THREE CATALYST PARTICLE SIZES.

TEMPERATURE DEPENDENCY OF CYCLOHEXANE HYDROGENOLYSIS.

INVENTORS.
NORMAN L. CARR
ALLEN E. SOMERS

CONVERSION OF BENZENE TO CYCLOHEXANE IN THE PRESENCE OF A CATALYST OF SMALL PARTICLE SIZE

This invention relates to an improved process for the production of cyclohexane. The basic process for the production of cyclohexane employed herein comprises the contacting of a mixture of benzene, cyclohexane and hydrogen under hydrogenation conditions in the presence of a supported Group VI and Group VIII metal hydrogenation catalyst. The improvement disclosed herein comprises utilization of a hydrogenation catalyst comprising particles of exceptionally small diameter to improve the activity of the hydrogenation reaction of benzene to cyclohexane without materially affecting competing hydrogenolysis reactions such as conversion of cyclohexane to normal hexane, thereby increasing the selectivity of the process for the production of cyclohexane.

The subject invention is a process for the production of substantially pure cyclohexane comprising contacting a mixture of benzene, hydrogen, and cyclohexane under hydrogenating conditions in the presence of a hydrogenating catalyst, wherein said hydrogenating catalyst particle is less than one-tenth inch in diameter. In a preferred embodiment of the present invention wherein a plurality of hydrogenating zones are employed, the catalyst particles in the final hydrogenating zone are substantially smaller in diameter than catalyst particles employed in the preceding hydrogenation zones.

Figure 2:
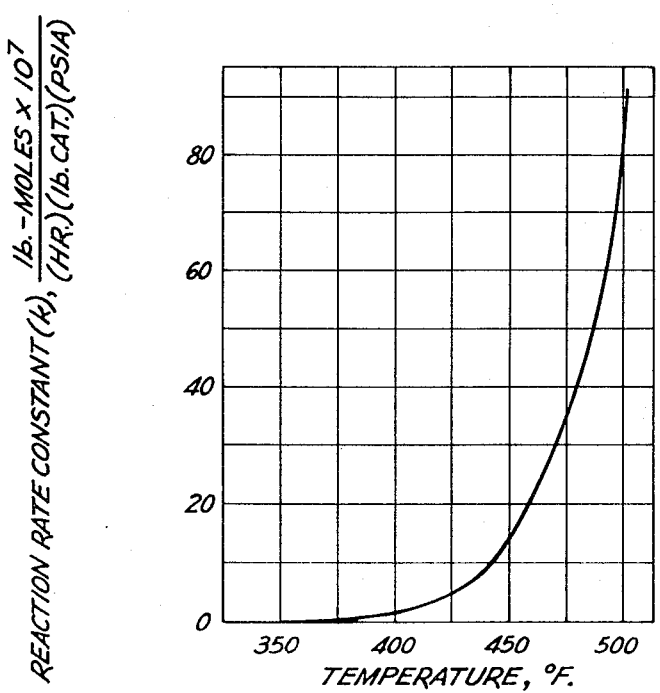

In brief, FIG. 1 is a plot relating the conversion of benzene to cyclohexane to space time, reciprocal weight hourly space velocity, weight catalyst-hours per weight total feed, for three different catalyst particle sizes. FIG. 2 is a plot showing the effects of temperature on the rate constant (k) for cyclohexane hydrogenolysis. Each figure will be explained in more detail hereinafter.

When cyclohexane is used as a chemical intermediate, as for example, in the manufacture of nylon-6 and nylon-6,6, it must be of high purity. That is, the purity must be above 99 mole percent, preferably above 99.5 mole percent and even above 99.9 mole percent. To produce cyclohexane of this purity by the hydrogenation of benzene an active hydrogenation catalyst must be employed. These active hydrogenation catalysts have the potential to substantially completely hydrogenate the benzene starting material, but at the same time they promote undesirable side reactions such as the hydrogenolysis or ring opening of the cyclohexane after it is formed. This hydrogenolysis reaction produces predominantly straight chain paraffins in the product that are difficult if not impossible to remove by conventional means. When the straight chain paraffin is normal hexane, the boiling point difference between n-hexane and cyclohexane is not large enough to allow separation of the n-hexane impurity from the cyclohexane product by distillation. It is an object of this invention to produce cyclohexane containing less than 1,000 p.p.m. n-hexane impurity, preferably less than 500 p.p.m. n-hexane and even less than 100 p.p.m. n-hexane.

Another impurity encountered in the production of substantially pure cyclohexane is unreacted benzene. A practical solution for eliminating benzene from the product is to convert it, or substantially convert it, to the desired cyclohexane product. It is well known in the hydrogenation art that higher temperatures and pressures increase the rate of hydrogenation. It is also well known that decreasing the space velocity and catalyst particle size tend to increase conversion in catalytic reactions. However, it is also well known that the hydrogenolysis reaction is also catalytic and responds to changes in the process variables in the same manner as does the hydrogenation reaction. It has now been found that by reducing the catalyst particle size to a size within the range of this invention, the rate of hydrogenation of benzene to cyclohexane is increased without proportionally increasing the rate of the undesirable hydrogenolysis reaction. An advantage of the present invention is an increase in purity of the cyclohexane product by utilizing a catalyst of small particle size. In accordance with this invention, substantially pure cyclohexane is produced containing less than 1,000 p.p.m. benzene, preferably less than 500 p.p.m. benzene and even less than 100 p.p.m. benzene. By substantial conversion of benzene to cyclohexane, we mean a conversion of 99.9 to 100.0 mole percent, preferably above 99.95 mole percent.

As catalyst, any hydrogenation catalyst known in the art for converting an aromatic to the corresponding cycloparaffin can be employed, for example, a hydrogenating metal distended on a refractory support, such as nickel, cobalt, molybdenum, tungsten, platinum, palladium, etc., on silica, alumina, silica-alumina, silica-magnesia, silicon carbide, natural materials, such as clay or kieselguhr, etc., wherein the hydrogenating metal will constitute from about 0.1 to about 90 percent by weight, preferably from about 0.5 to about 70 percent by weight, based on the catalyst and its support. Generally, if platinum, palladium or another noble metal is employed it will constitute about 0.1 to about 2.0 percent by weight based on the catalyst and its support. If nickel, cobalt, molybdenum, tungsten and the like are employed, either alone or in admixture, as the hydrogenating metal, they will usually comprise from about 5.0 to about 90 percent of the weight of the catalyst and support. A preferred hydrogenating catalyst is one containing from about 10 to about 70 percent by weight, based on the total catalyst, of nickel on kieselguhr. The supported Group VI and Group VIII metal hydrogenating catalyst can also contain composited alkali metal and/or alkaline-earth metal and can be promoted by the addition of halogen compounds.

The smallest diameter of the catalyst particles of the present invention is between about one-tenth and one-fortieth inch, preferably one-half and one thirty-second inch. The catalyst can be in any suitable configuration such as roughly cubical, needle-shaped or round granules, spheres, cylindrically shaped extrudates, etc. By smallest particle diameter we mean the smallest surface to surface dimension through the center or axis of the catalyst particle, regardless of the shape of the particle. The cylindrical extrudate form having a length between about one-sixteenth inch and three-sixteenth inch is highly suitable. The small particle size catalyst of this invention can be prepared so that nearly all or at least about 92 or 96 percent of the particles are within the range of this invention. The smallest diameter catalyst particle that can be employed in this invention is dictated by the physical strength of the catalyst particle. The physical strength of the particle should be sufficient to insure that a substantial quantity of the particles retain their original shape when employed in the reaction system. Utilizing present methods of preparation, the one thirty-second inch diameter catalyst particle appears to approach the smallest particle diameter and the one-fortieth inch particle appears to be the smallest particle practical for commercial operation.

In general, the processing scheme of the present invention comprises passing a mixture of benzene, cyclohexane, and hydrogen gas at a temperature of from about 280° F., to about 300° F., and a pressure of about from 430 p.s.i. to about 470 p.s.i. into contact with a hydrogenation catalyst in an adiabatic reaction zone. In passing through the hydrogenation catalyst contacting zone the temperature of the reactants increases as benzene is hydrogenated to cyclohexane. After essentially complete hydrogenation, that is, hydrogenation of above about 99.5 percent, the reactants are withdrawn from the contacting zone at a temperature of from about 440° F., to about 490° F., and subsequently cooled. The cooled reactants are commingled with more benzene and cyclohexane so that the temperature of the mixture is from about 310° F., to about 330° F. and passed into contact with a second bed of hydrogenating catalyst wherein at least partially complete hydrogenation occurs and a temperature of from about 480° F. to about 520° F. is reached. Reactants removed from this contacting zone are again cooled and commingled with benzene to obtain a temperature of from about 310° F. to about 330° F. In each succeeding reaction zone the benzene is added to the inlet and the commingled stream of reactants and cyclohexane is introduced into the reaction zone at a temperature of from about 310° F. to about 330° F. The hydrogen is passed through the various zones in series and the benzene is passed through in parallel, that is a portion of the initial benzene charge is introduced into the inlet of each reaction zone.

A lesser portion of benzene is usually introduced into the last of the reaction zones so that the last zone produces the high-purity cyclohexane of this invention. The conversion in the last reaction zone is above about 99.9 percent and preferably above about 99.95 percent. The hydrocarbons and hydrogen introduced into each reaction zone must be in the vapor phase and the reactors in each zone are of the fixed bed catalyst type, wherein the vapor flows through the reactor and the catalyst remains fixed with the reactor in a nonfluidized condition. The effluent stream from the last reaction zone is withdrawn, cooled at a temperature which usually is from about 90° F. to about 120° F. and passed into a receiver in which the effluent separates into a gaseous phase which is substantially pure hydrogen and a liquid phase which is substantially pure cyclohexane. The gaseous phase is recycled to the inlet of the first contacting zone and a separately withdrawn cyclohexane stream is divided; a portion passing a final product and another portion passing to the inlet to the first and second contacting zones as a diluent for the benzene feed.

Experimental data gathered on the above-described system are illustrated in FIG. 1. FIG. 1 is a semilog graph indicating the effect of catalyst particle size on the hydrogenation rate of benzene to cyclohexane. The ordinate of FIG. 1 is the concentration of benzene ($Y_{in}$) in the reactor feed divided by the concentration of benzene ($Y_{out}$) in the reactor effluent. The expression $Y_{in}/Y_{out}$ is equivalent to the expression $1/1-X$, where X is the fractional conversion of benzene to cyclohexane. The abscissa of FIG. 1 is the space time which is the reciprocal of the total weight hourly space velocity. Three nickel on kieselguhr catalyst systems containing approximately 50 weight percent nickel were employed in the experiments. Each catalyst system comprised particles of a different particle size from the others. The largest diameter catalyst particle was a one-eighth inch pellet, the smallest particle size catalyst was a 20–40 mesh granular catalyst corresponding to approximately one-fortieth inch diameter catalyst particle, and the intermediate catalyst particle was a one-twelfth inch diameter extrudate. The surface area per unit weight and pore volume distribution for each of the three catalysts was about equal. The conversion of benzene to cyclohexane was determined at a given space time, for each of the three different sizes of catalyst particles. The operating conditions employed in each hydrogenation system were: an average system temperature of 400° F., a pressure of 450 p.s.i., a hydrogen-to-carbon ratio of 2:1 and an initial benzene concentration in the feed of 15.0 weight percent with the balance of the feed being cyclohexane.

The results of these tests are shown in FIG. 1 and indicate that the hydrogenation reaction conformed to first order reactions kinetics. The relationship between conversion and space time for each catalyst size can be represented by a straight line connecting the origin of FIG. 1 to the data points obtained for each of the three different size catalyst particles. The slope of the straight line thus obtained represents the reaction rate constant ($k$) for each of the three catalyst sizes employed. The space time required to accomplish a given conversion is then represented by equation (1):

(1)
$$\text{Space time (ST)} = \frac{ln(Y_{in}/Y_{out})}{k}$$

Utilizing the above formula, and FIG. 1, the space time required to convert a feed of 20.0 weight percent benzene to a product containing 8.0 wt. percent benzene ($Y_{in}/Y_{out}$=2.5) for each of the three catalysts particle sizes is as follows:

| Catalyst Size | Space Time, Wt. Cat. —Hrs./Wt. Total Feed |
|---|---|
| 1/8 inch | 0.0087 |
| 1/12 inch | 0.0045 |
| 1/40 inch | 0.00124 |

The activity for conversion of benzene to cyclohexane of each catalyst particle size relative to another catalyst of different particle size at a given conversion level is proportional to the respective space times for each catalyst particle size. Therefore, the relative activity of each smaller particle size catalyst to the one-eighth inch particle size catalyst is as follows:

| Catalyst Size | Relative Activity |
|---|---|
| 1/8 inch | 1.0 |
| 1/12 inch | 1.9 |
| 1/40 inch | 7.0 |

The relative activity is equivalent to a size ratio for two reactors that accomplish the same conversion at the same fundamental conditions of temperature, pressure and inlet composition. Therefore, when the one-eighth inch catalyst particles are employed, the reactor is seven times as large as when the one-fortieth inch catalyst particles are employed.

The above data shows the great advantage of employing small particle size catalyst of this invention in the hydrogenation of benzene to cyclohexane. It was expected that the smaller catalyst particles would similarly increase the activity of the hydrogenolysis reaction of cyclohexane to straight chain paraffins. Unexpectedly, tests showed that hydrogenolysis activity was not influenced by catalyst particle size. The one-eighth inch and the one-twelfth inch catalyst particle sizes were utilized in these tests. The conversion of cyclohexane to n-hexane is influenced by space time in that when space time is increased, the hydrogenolysis of cyclohexane is normally increased. Therefore, when space time is reduced, but a high level of benzene conversion is maintained by employing a smaller catalyst particle, the net effect is to produce a cyclohexane product of high purity containing only small amounts of the n-hexane impurity. For example, the n-hexane content of a product containing 20 p.p.m. benzene produced at 480° F. from a feed stock containing 20.0 weight percent benzene for the three catalysts described in the hydrogenation experiments above is as follows:

| Catalyst size | Space time: wt. cat.-hrs./wt. total feed | Impurity, p.p.m. at 480° F. | |
|---|---|---|---|
| | | Benzene | n-Hexane |
| 1/8" | 0.087 | 20 | 2000 |
| 1/12" | 0.045 | 20 | 1030 |
| 1/40" | 0.012 | 20 | 280 |

The minimum space time that can be employed at a given temperature to produce substantially pure cyclohexane is that space time required to obtain a high conversion of benzene to cyclohexane. Suitable ranges of space times for one-eighth inch catalysts in accordance with this invention are from about 0.05 to 0.15 Wt. catalyst-Hrs./Wt. Total feed, in the temperature range from 350° to 550° F. Therefore, the hydrogenation space time is controlling and when this hydrogenation space time is reduced by employing the small catalyst particles of this invention the hydrogenolysis side reaction simultaneously produces less paraffins, whereby higher purity cyclohexane product is obtained.

Comparing the data in the last two tabulations above, it can be seen that the same conversion of benzene to cyclohexane can be accomplished by employing one-fortieth inch catalyst in place of the one-eighth inch catalyst at one-seventh of the space time and simultaneously the n-hexane impurity can be reduced more than seven-fold.

The present invention realizes a cyclohexane process which permits a high conversion of benzene to cyclohexane at a high space velocity and by utilizing a sufficiently high space velocity which avoids an equivalent increase in the conversion of cyclohexane to paraffins the process becomes more selective for conversion to the desired cyclohexane product. Suitable space times for one-fortieth inch catalysts in the temperature range of 350°–500° F. in accordance with this invention are from about 0.005 to 0.02 Wt. catalyst-hrs./wt. total feed, preferably from about 0.010 to 0.015. Suitable space times for the one-twelfth inch catalyst in the temperature range of 350°–500° F. in accordance with this invention are from about 0.025 to 0.08 wt. catalyst-Hrs./wt. Total Feed.

The increase in conversion of benzene to cyclohexane, or decrease in space time for a required conversion, by employing the reduced size catalyst particle of this invention is far greater than could be predicted from any current theoretical approach. A theoretical calculation method as outlined in Satterfield and Sherwood, *The Role of Diffusion in Catalysis*, Addison-Wesley Pub. Co., p. 62, 1963 would predict at the most a four-fold decrease in space time when the catalyst particle is reduced from one-eighth inch diameter to one-fortieth inch diameter, when in fact we realize a seven-fold decrease.

The concentration of benzene in relation to the concentration of cyclohexane decreases as the hydrocarbon stream progresses through the multiple reactor system. This fact shifts the equilibrium away from the desired benzene to cyclohexane reaction and favors the reverse cyclohexane to benzene reaction. Therefore, it is most important to have the most active catalyst in the final reactor and in this final reactor the greatest benefit of utilizing the smaller size catalyst is realized. The benefit realized in the third reactor of a three reactor system is demonstrated below when the average reaction temperature is 480° F. and for plant which produces 3000 BBL./day of cyclohexane product.

| Product purity | Catalyst size, inches | | |
|---|---|---|---|
| | ⅛ | ¹⁄₁₂ | ¹⁄₄₀ |
| Benzene, p.p.m. | 20 | 20 | 20 |
| C₆ paraffins, p.p.m. | 2,000 | 1,030 | 280 |
| Space time | 0.087 | 0.045 | 0.012 |
| Reactor size, lb. catalyst in third reactor | 10,000 | 5,250 | 1,430 |
| Pressure drop across third reactor, p.s.i. | 25 | 20 | 11 |

A deterrent to utilizing a catalyst of small particle size is that, generally, as catalyst particle size is reduced, pressure drop through a reactor is increased. However, as indicated above the pressure drop in the third reactor of a three reactor system actually is reduced from 25 p.s.i. to 11 p.s.i. when the catalyst particle diameter is reduced from one-eighth inch to one fortieth inch, because in accordance with this invention reduced catalyst quantity is used to achieve a high yield.

Temperature has a significant effect on the hydrogenolysis of cyclohexane. The exponential effect of increasing temperature on the hydrogenolysis reaction rate is illustrated by FIG. 2. FIG. 2 is a plot of hydrogenolysis rate constant ($k$), versus temperature. The hydrogenolysis reaction rate constant ($k$) is related to conversion and space time as represented by equation (2) as follows:

(2) $\quad X = k \times$ space time (ST)

where $X$ is the fractional conversion of cyclohexane to paraffin products.

An unexpected, but secondary advantage realized by employing the smaller particle size catalyst of this invention is that as the catalyst particle size is reduced, the temperature difference between the interior of the catalyst, where the hydrogenation reaction takes place, and the surrounding fluid is reduced. The narrowing of this temperature difference eliminated hot spots within the catalyst bed, and since the effect of temperature on the hydrogenolysis reaction is exponential, a catalyst bed of small catalyst particles will produce a cyclohexane product containing less normal paraffins. To state this phenomenon in another way, two catalyst beds containing different size catalyst particles, but operating at the same average reactor temperature, the same space time, pressure, benzene conversion, etc., the catalyst bed containing the smaller catalyst particles would produce the higher purity cyclohexane product.

We claim:

1. A process for the production of cyclohexane containing less than about 1,000 p.p.m. normal hexane and less than about 50 p.p.m. benzene comprising contacting a mixture of benzene, hydrogen, and cyclohexane under hydrogenating conditions including a temperature of about 350° F. to about 500° F. and a space time of about 0.005 to about 0.15 weight catalyst-hours per weight total feed in each reactor, in the presence of a hydrogenation catalyst, wherein said hydrogenation catalyst particle size is not more than one-tenth inch in diameter.

2. The process of claim 1 wherein said hydrogenating catalyst particle size if from about one-twelfth to about one-fortieth inch in diameter.

3. The process of claim 1 wherein said hydrogenating catalyst particle size is from about one-twelfth to about one thirty-second inch in diameter.

4. The process of claim 1 wherein said hydrogenation catalyst comprises metal selected from the group consisting of Group VI and Group VIII metals of the Periodic Table.

5. The process of claim 1 wherein said hydrogenating catalyst comprises nickel supported on kieselguhr.

6. A process for the production of cyclohexane comprising contacting a mixture of benzene, hydrogen, and cyclohexane under hydrogenating conditions including a temperature of about 350° F. to about 500° F. and a space time of about 0.005 to about 0.15 weight catalyst—hours per weight total feed in each reactor, in the presence of a hydrogenation catalyst, wherein said hydrogenation catalyst particle size is not more than one-tenth inch in diameter.

7. The process of claim 6 wherein the catalyst particle size is from about one-fortieth inch to one-tenth inch in diameter.

8. The process of claim 6 wherein the catalyst particle size is from about one-twelfth inch to about one thirty-second inch in diameter.

9. The process of claim 6 wherein said hydrogenating catalyst comprises metal selected from the group consisting of Group VI and Group VIII metals of the Periodic Table.

10. The process of claim 6 wherein said hydrogenating catalyst comprises a nickel supported on kieselguhr.

11. The process of claim 6, wherein the hydrogenation is performed in a plurality of hydrogenation zones.

* * * * *

PO-1050
(5/69)

UNITED STATES PATENT OFFICE
CERTIFICATE OF CORRECTION

Patent No. 3,622,645      Dated November 23, 1971

Inventor(s) Norman L. Carr and Allen E. Somers

It is certified that error appears in the above-identified patent and that said Letters Patent are hereby corrected as shown below:

COLUMN 2, LINE 31, "ONE-HALF" SHOULD READ --ONE-TWELFTH-- .

Signed and sealed this 16th day of May 1972.

(SEAL)
Attest:

EDWARD M. FLETCHER, JR.            ROBERT GOTTSCHALK
Attesting Officer                 Commissioner of Patents